United States Patent
Prats

(10) Patent No.: US 9,724,826 B1
(45) Date of Patent: Aug. 8, 2017

(54) SELECTING PHYSICAL ARRANGEMENTS FOR OBJECTS TO BE ACTED UPON BY A ROBOT

(71) Applicant: X Development LLC, Mountain View, CA (US)

(72) Inventor: Mario Prats, Palo Alto, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 32 days.

(21) Appl. No.: 14/724,193

(22) Filed: May 28, 2015

(51) Int. Cl.
*B25J 9/16* (2006.01)

(52) U.S. Cl.
CPC ... *B25J 9/1664* (2013.01); *G05B 2219/40463* (2013.01); *G05B 2219/40465* (2013.01); *G05B 2219/40519* (2013.01)

(58) Field of Classification Search
CPC ...... B25J 9/1664; B25J 9/1666; B25J 9/1671; G05B 2219/40461; G05B 2219/40463; G05B 2219/40465; G05B 2219/40466; G05B 2219/39357; G05B 2219/39361
See application file for complete search history.

(56) References Cited

U.S. PATENT DOCUMENTS

| | | | |
|---|---|---|---|
| 4,638,445 A | 1/1987 | Mattaboni | |
| 4,786,847 A | 11/1988 | Daggett et al. | |
| 5,303,384 A | 4/1994 | Rodriguez et al. | |
| 5,908,458 A | 6/1999 | Rowe et al. | |
| 5,946,673 A | 8/1999 | Francone et al. | |
| 6,341,246 B1 | 1/2002 | Gerstenberger et al. | |
| 6,526,373 B1 | 2/2003 | Barral | |
| 7,211,980 B1 | 5/2007 | Bruemmer et al. | |
| 7,802,193 B1 | 9/2010 | McDonald et al. | |
| 7,853,356 B2 | 12/2010 | Tsai et al. | |
| 7,908,405 B2 | 3/2011 | Yung et al. | |
| 8,060,251 B2 | 11/2011 | Gonzalez-Banos et al. | |
| 8,271,132 B2 | 9/2012 | Nielsen et al. | |
| 8,355,818 B2 | 1/2013 | Nielsen et al. | |
| 8,401,698 B2 | 3/2013 | Kamrani et al. | |
| 8,571,706 B2 | 10/2013 | Zhang et al. | |
| 8,818,555 B2 | 8/2014 | Kim et al. | |

(Continued)

OTHER PUBLICATIONS

Trivedi, Nishant, et al. "Communicating, Interpreting, and Executing High-Level Instructions for Human-Robot Interaction." AAAI Fall Symposium: Advances in Cognitive Systems. 2011, 8 pages.

(Continued)

*Primary Examiner* — Adam Mott
(74) *Attorney, Agent, or Firm* — Middleton Reutlinger

(57) ABSTRACT

Methods, apparatus, systems, and computer-readable media are provided for determining one or more spatial constraints associated with an object to be acted upon by a robot; determining a plurality of candidate physical arrangements of the object that satisfy the one or more spatial constraints; calculating, for one or more of the plurality of candidate physical arrangements of the object, a candidate physical arrangement cost that would be incurred as a result of the robot acting upon the object in the candidate physical arrangement; and selecting, from the plurality of candidate physical arrangements, a candidate physical arrangement associated with a candidate physical arrangement cost that satisfies a criterion.

14 Claims, 9 Drawing Sheets

(56) References Cited

U.S. PATENT DOCUMENTS

| | | |
|---|---|---|
| 8,868,241 B2 | 10/2014 | Hart et al. |
| 2005/0234592 A1 | 10/2005 | McGee et al. |
| 2006/0117324 A1 | 6/2006 | Alsafadi et al. |
| 2010/0241248 A1* | 9/2010 | Zhang .............. G05B 19/41885 700/29 |
| 2011/0035050 A1* | 2/2011 | Kim ....................... B25J 9/1666 700/246 |
| 2011/0106309 A1 | 5/2011 | Lim et al. |
| 2013/0096719 A1 | 4/2013 | Sanders et al. |
| 2013/0116828 A1 | 5/2013 | Krause et al. |
| 2013/0343640 A1 | 12/2013 | Buehler et al. |
| 2014/0136302 A1 | 5/2014 | Song et al. |
| 2014/0195054 A1 | 7/2014 | Kamiya |
| 2014/0214208 A1 | 7/2014 | Shimizu et al. |
| 2014/0324269 A1 | 10/2014 | Abramson et al. |
| 2015/0005622 A1 | 1/2015 | Zhao et al. |
| 2015/0045813 A1 | 2/2015 | Kostrzewski et al. |
| 2016/0034613 A1* | 2/2016 | Hazan ................. G06F 17/5009 703/13 |

OTHER PUBLICATIONS

Stilman, Mike. "Task constrained motion planning in robot joint space." Intelligent Robots and Systems, 2007. IROS 2007. IEEE/RSJ International Conference on. IEEE, 2007, pp. 3074-3081.

Haber Adam, Unsw Edu, and Claude Sammut. 'A Cognitive Architecture for Autonomous Robots.' 2013, pp. 257-275.

Brown S., & Sammut, C. (2011). Tool Use Learning in Robots. Proceedings of the 2011 AAAI, 8 pages.

Remy, C. David, Keith Buffinton, and Roland Siegwart. 'Comparison of cost functions for electrically driven running robots.' Robotics and Automation (ICRA), 2012 IEEE International Conference on. IEEE, 2012, pp. 2343-2350.

Boularias et al.; Efficient Optimization for Autonomous Robotic Manipulation of Natural Objects, The robotics Institute, Canegie Mellon University, 2014, Pittsburgh, USA.

Park et al.; ITOMP: Incremental Trajectory Optimization for Real-time Replanning in Dynamic Environments; University of North Carolina; 2012; US.

Olson et al.; Mole2D—Part II: a Case Study; 2013; pp. 18-41.

* cited by examiner

SELECTING PHYSICAL ARRANGEMENTS FOR OBJECTS TO BE ACTED UPON BY A ROBOT

BACKGROUND

A robot may act upon objects in an environment in various manners, depending on the capabilities of the robot, the nature of the object to be acted upon, and the nature of the environment. For example, the robot may have the option of traversing an end effector such as a claw or other tool along any one of multiple "candidate" paths between a first location and a second location in order to pick up some object from the first location and place the object at the second location. Additionally, the robot may be able to perform various aspects of the task in a variety of configurations. For example, depending on the nature of an object to be moved, the robot may have the option to position a claw around the object from a variety of angles, any of which may be acceptable. Moreover, the object may be subject to spatial constraints that allow it to be placed in a variety of locations, orientations, and/or configurations. Further, the robot may be able to strike any number of different sets of poses while performing the task. The paths, configurations (of the robot and the object), and poses available to the robot may be limited only by inherent constraints of the robot (e.g., its reach), environmental constraints (such as obstacles), and/or constraints associated with objects to be acted upon (e.g., is it permissible for the object to be tilted while moved?). However, depending on the paths, configurations and/or poses selected, the robot may move with various degrees of smoothness and/or a variety of costs may be incurred, such as wear and tear or excessive robot motion.

SUMMARY

The present disclosure is generally directed to methods, apparatus, and computer-readable media (transitory and non-transitory) for identifying feasible, or "candidate," physical arrangements of objects within a robot's workspace, and then examining those identified physical arrangements to select one or more physical arrangements that will facilitate various robot performance increases and/or to account for various costs, e.g., optimizing the robot workspace. In various implementations, one or more spatial constraints associated with an object to be acted upon by a robot may be determined. Spatial constraints may include, for instance, a space within which the object must be contained to fit workspace setup constraints, one or more acceptable or unacceptable orientations of the object, and/or one or more acceptable or unacceptable configurations of the object. Once the spatial constraints associated with the object are determined, a plurality of candidate physical arrangements of the object that satisfy the one or more spatial constraints may be determined and examined. A "candidate physical arrangement" may be a combination of an acceptable location, orientation, and configuration of the object. In various implementations, a candidate physical arrangement cost that would be incurred when the robot acts upon the object in each candidate physical arrangement may be determined. In some implementations, output may then be provided that indicates one or more candidate physical arrangements associated with one or more candidate physical arrangement costs that satisfy a criterion. For example, a technician may be presented (e.g., on a graphical user interface) with one or more acceptable physical arrangements in which an object to be acted upon by a robot may be placed.

Selecting physical arrangements of objects to be acted upon by a robot within a workspace to account for various costs provides various technical advantages. For example, if acting upon an object in a particular physical arrangement would impart less wear and tear on one or more operational components of the robot than other physical arrangements of the object, then selecting that physical arrangement, especially when the tasks is to be repeated over and over again, may extend a lifetime of the one or more operational components, reducing costs and robot downtime. As another example, if acting upon an object in a particular physical arrangement would result in less overall robot motion (e.g., which may require less overall execution time) than other physical arrangements of the object, then selecting that physical arrangement, especially when the tasks is to be repeated over and over again, may increase efficiency and/or safety.

In some implementations, a computer implemented method may be provided that includes the steps of: determining one or more spatial constraints associated with an object to be acted upon by a robot; determining a plurality of candidate physical arrangements of the object that satisfy the one or more spatial constraints; calculating, for one or more of the plurality of candidate physical arrangements of the object, a candidate physical arrangement cost that would be incurred as a result of the robot acting upon the object in the candidate physical arrangement; and selecting, from the plurality of candidate physical arrangements, a candidate physical arrangement associated with a candidate physical arrangement cost that satisfies a criterion.

This method and other implementations of technology disclosed herein may each optionally include one or more of the following features.

In some implementations, the plurality of physical arrangements may include a plurality of potential sites of the object that satisfy the spatial constraints, a plurality of potential orientations of the object that satisfy the spatial constraints, and/or a plurality of potential configurations of the object that satisfy the spatial constraints.

In some implementations, the method may further include determining a plurality of candidate paths traversable by a reference point of an end effector of the robot between a first site and a plurality of sites corresponding to the plurality of candidate physical arrangements of the object. In some implementations, the method may further include calculating, for one or more of the plurality of candidate paths, a candidate path cost that would be incurred during traversal of the reference point along the candidate path; and selecting, from the plurality of candidate paths, a candidate path with an associated candidate path cost that satisfies a criterion. In some implementations, calculating the candidate physical arrangement cost that would be incurred as a result of the robot acting upon the object in the candidate physical arrangement is based at least in part on the candidate path cost associated with the selected candidate path.

In some implementations, the method further includes determining a path traversable by a reference point associated with an end effector of the robot to a site corresponding to at least one of the plurality of candidate physical arrangements of the object; and determining a plurality of candidate instructions sets, each candidate instruction set configured to cause the robot to assume a different respective set of poses while traversing the reference point along the path. In some implementations, the method may further include calculating a candidate instruction set cost that would be incurred to implement each candidate instruction set to traverse the reference point along the path; and selecting, from the plurality of candidate instruction sets, a candidate instruction set associated with a candidate instruction set cost that satisfies a criterion. In some implementations, calculating the candidate physical arrangement cost that would be incurred as a result of the robot acting upon the object in the candidate physical arrangement is based at least in part on the candidate instruction set cost associated with the selected candidate instruction set.

In some implementations, the method may further include building a pose tree and calculating the candidate physical arrangement costs based on traversal of the pose tree. In some implementations, calculating the candidate physical arrangement cost that would be incurred as a result of the robot acting upon the object in the candidate physical arrangement may include calculating the candidate physical arrangement cost that would be incurred by a one or more operational components of the robot as a result of the robot acting upon the object in the candidate physical arrangement.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
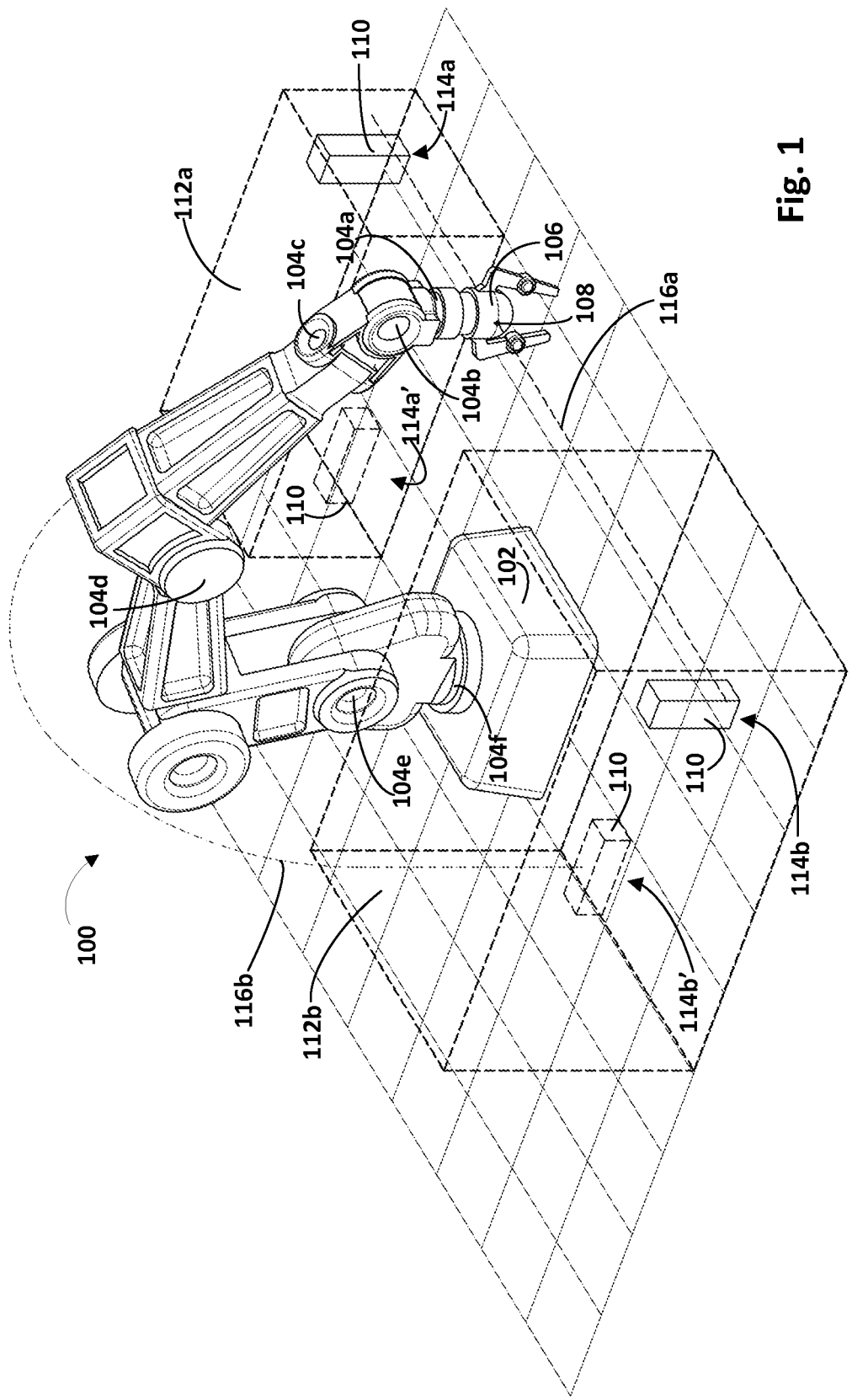
FIG. 1 illustrates an example robot in an example workspace, with an object to be acted upon by the robot depicted in various alternative physical arrangements, in accordance with various implementations.

FIG. 1 illustrates an example robot 100 (in a form often referred to as a "robot arm") that includes a base 102 and a plurality of operational components, six of which are referenced in FIG. 1A with 104a-f. Robot 100 may include other operational components, but those are not labeled in FIG. 1 for the sakes of clarity and brevity. As used herein, an "operational component" of a robot may refer to actuators, motors (e.g., servo motors), joints, shafts, gear trains, pumps (e.g., air or liquid), pistons, drives, or other components that may create and/or undergo propulsion, rotation, force, torque, velocity, and/or motion. Some operational components may be independently controllable, although this is not required. In some instances, the more operational components robot 100 has, the more degrees of freedom of movement it may have.

Robot 100 also includes an end effector 106. As used herein, "end effector" may refer to a variety of tools that may be operated by robot 100 in order to accomplish various tasks. In FIGS. 1-4, for example, end effector 106 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

End effector 106 may define an abstract reference point 108. Reference point 108 may be a point of end effector 106 that traverses a particular path when robot 100 moves between sites. In some implementations, reference point 108 may be a center of gravity of end effector 106, or a point near where end effector 106 attaches to robot 100, although this is not required. Robots typically, and robot 100 in particular, may have multiple degrees of freedom of movement. Accordingly, and as noted in the background, it is possible for robot 100 to traverse reference point 108 of end effector 106 along the same path in multiple ways, each time striking a different set of poses. As used herein, a "pose" refers to a particular configuration of components of robot 100 relative to one another at a particular moment in time (e.g., a "snapshot"). When robot 100 is inactive, it may be in (or "strike") a single pose until it moves again. When robot 100 moves, it may strike a series of poses to effectuate the movement.

As noted above, an object 110 to be acted upon by robot 100 may be arranged in a robot workspace in infinite ways. Some of those physical arrangements may violate workspace or robot constraints. Other physical arrangements within the workspace may be feasible, and therefore may be considered "candidate" physical arrangements. How an object is arranged within the workspace may impact how robot 100 is able to perform its task. For example, object 110 may be placed at different positions within boundary volumes 112a and 112b that correspond to an origin and destination, respectively, of object 110. In some implementations, boundary volumes 112a and 112b may define volumes in which object 100 must be contained in order to fit workspace setup constraints. For example, in FIG. 1, object 110 may be located at a first acceptable location 114a within first boundary volume 112a or at a second acceptable location 114a' within first boundary volume 112a. Likewise, object 110 may be located at a third acceptable location 114b within second boundary volume 112b or at a fourth acceptable location 114b' within second boundary volume 112b. Object 110 may also be oriented in various ways. For example, in FIG. 1, object 100 is oriented upright, or "vertically," at first acceptable location 114a and third acceptable location 114b, and is oriented "horizontally" at second acceptable location 114a' and fourth acceptable location 114b'. Although not depicted in FIG. 1, spatial constrains may also include, for instance, one or more acceptable configurations of object 110. A "configuration" object may refer to the object's state, e.g., how exterior components are arranged on object, whether object is open or closed, whether a container object is empty or full, etc.

As noted in the background, robot 100, various "candidate physical arrangement costs" may be incurred as a result of object 110 being in different candidate physical arrangements when acted up by robot 100. A candidate physical arrangement cost may include, for instance, cost that would be incurred by one or more selected operational components 104 of robot 100 as a result of robot 100 acting upon object 110 while object 110 is in the candidate physical arrangement. In some implementations, even infeasible object physical arrangements (e.g., physical arrangements that violate workspace setup constraints) may be considered to have costs, although those costs may be considered "infinite," and therefore those physical arrangements may be disregarded. Suppose there is no feasible trajectory for an object to travel between an origin physical arrangement and a destination physical arrangement. In such instance, one or both of the origin and destination physical arrangements may be considered to have infinite cost.

As an example, suppose robot 100 is to transport object 110 from first acceptable location 114a to third acceptable location 114b. Robot 100 may traverse end effector 106, and more particularly, reference point 108 of end effector 106, along a first path 116a. Transporting object 110 along path 116a may result in robot 100 incurring a first candidate physical arrangement cost. Robot 100 may alternatively transport object 110 from second acceptable location 114a' to fourth acceptable location 114b' along a second path 116b that passes over top of robot 100. Transporting object 110 along path 116b may result in robot 100 incurring a second candidate physical arrangement cost. In some implementations, whichever of the first and second candidate physical arrangement costs is lower may be preferable. Thus, for example. if the second candidate physical arrangement cost is lower than the first candidate physical arrangement cost, then it may be preferable for object 110 to be horizontally oriented (as depicted at locations 114a' and 114b') and transported between second acceptable location 114a' and fourth acceptable location 114b'. Of course, other permutations are possible. For example, robot 100 could transport object 110 from first acceptable location 114a to fourth acceptable location 114b', or from second acceptable location 114a' to third acceptable location 114b; however, all permutations are not discussed here for the sakes of brevity and clarity.

Other types of costs besides wear and tear may be considered as candidate physical arrangement costs. For example, excessive and/or unnecessary motion imparted or experienced by robot 100 (e.g., by one or more operational components 104) may be considered as candidate physical arrangement costs. Excessive motion may lead to, for instance, overlong robot task execution time, or worse, safety concerns, particularly where robot 100 operates in confined quarters with personnel or other valuable equipment. Various measures may be used as proxies for costs. For example, force, motion, velocity, and/or torque experienced and/or imparted by one or more operational components 104 may be considered as proxies for costs. Other measures may be used as proxies for costs as well, including but not limited to measures of proximity (or "distance") of operational components 104 to their specific operational limits, one or more manipulability measures, measures of proximity (or distance) of operational components 104 to preferred or desired configurations, and so forth.

A candidate physical arrangement cost may be calculated based on various factors. In some implementations, for each candidate physical arrangement of the object, there may be multiple candidate paths traversable by reference point 108 of end effector 106 to position end effector 106 at an appropriate position to act upon object 110 in the given candidate physical arrangement. And for each of those candidate paths, there may be a plurality of candidate sets of poses (each implemented by robot 100 executing a respective instruction set) that robot 100 can strike while traversing reference point 108 along each path. Accordingly, in some implementations, a candidate physical arrangement cost, or "CPAC", may be calculated based on so-called "candidate path costs" (or "CPC") and/or based on so-called "candidate instruction set costs" ("CISC"). In some implementations, equations such as the following may be employed to determine, from a set of costs associated with the set of candidate physical arrangements, ($CPAC_1$, $CPAC_2$, . . . , $CPAC_i$), a CPAC that best satisfies some criterion (e.g., minimum cost):

$$CPAC_i = \min(CPC_1, CPC_2, \ldots, CPC_M) \text{ and} \quad (1)$$

$$CPC_j = \min(CISC_1, CISC_2, \ldots, CISC_N)) \quad (2)$$

In other words, for each candidate path, a CISC of a candidate set of instructions (that will cause robot 100 to strike a candidate set of poses while traversing reference point 108 of end effector 106 along the candidate path) having the lowest CISC may be selected as the cost (or CPC) of that candidate path. Then, for each candidate physical arrangement, a CPC of a candidate path having the lowest CPC may be selected as the cost (or CPAC) for that candidate physical arrangement. Ultimately, an indication of the candidate physical arrangement having the lowest CPAC may be provided as output, e.g., as an instruction to the user to place object 110 in that candidate physical arrangement.

A cost incurred when robot 100 performs a particular task may be calculated in various ways. For example, force, velocity, torque, and/or motion experienced and/or imparted by one or more operational components 104 may be used as a proxy for cost. One assumption may be that the more force/velocity/torque/motion imparted/experienced by the component(s), the more wear and tear (and hence, cost) the one or more operational components 104 incur. Another assumption may be that the more force/velocity/torque/motion imparted/experienced by the component(s), the more excessive robot motion that occurs. The force, velocity, torque, and/or motion imparted/experienced by an operational component when robot 100 performs a particular task may depend on a variety of factors. For example, force such as torque exerted by/on an operational component 104 such as a motor or joint may be influenced by the weight of object 110 being carried by robot 100, as well as a manner in which robot 100 carries object 110. Lifting object 110 from a first angle may distribute weight of object 110 across more operational components 104 of robot 100 than lifting object 110 from a second angle. As additional examples, force/motion exerted by/on an operational component 104 may also depend on one or more weights of one or more other components of robot 100, positions of those other components of robot 100 relative to the operational component 104 in question during various robot poses, and/or durations of those various robot poses.

As noted above, robot 100 may strike various alternative sets of poses while transporting object 110 along a candidate path. Depending on which set of poses robot 100 strikes, various costs may be incurred. For example, if robot 100 strikes a first set of poses while traversing reference point 108 along a path, one operational component 104a may experience and/or cause a first measure of force, velocity, torque and/or motion, and a second operational component 104b may experience and/or cause a second measure of force, velocity, torque and/or motion. By contrast, if robot 100 strikes a second set of poses while traversing reference point 108 along the same path, operational component 104a may experience and/or cause a third measure of force, velocity, torque and/or motion that is greater than the first measure of force, velocity, torque and/or motion, and second operational component 104b may experience and/or cause a fourth measure of force, velocity, torque, and/or motion that is less than the second measure of force, velocity, torque, and/or motion. If, for instance, second operational component 104b is more expensive to replace than first operational component 104a, then it may be preferable for robot 100 to strike the second set of poses rather than the first set while traversing reference point 108 along the path, especially over a large number of repetitions, to extend the useful life of second operational component 104b.

In some implementations, a plurality of candidate "instructions sets," each executable by robot 100 to cause it to assume (or "strike") a different respective set of poses while traversing the reference point along the reference path, may be calculated. As used herein, an "instruction set" may be a set of instructions (e.g., commands, machine code instructions, motion primitives, etc.) that are executable by a robot (e.g., robot 100) to perform one or more actions. Next, those candidate instruction sets may be analyzed to determine their respective CISCs. If the goal is to maximize the lifetime of a single component 104, then the candidate instruction set that would yield the lowest CISC incurred by that component 104 may be selected. If the goal is to maximize an average lifetime of a plurality of components 104, then the candidate instruction set that would yield the lowest average CISC across those components 104 may be selected.

In some implementations, a "brute force" approach may be utilized to identify candidate instruction sets that achieve high level task descriptions in view of various constraints, and to select one or more of the candidate instruction sets based on various criteria, such as minimizing CISC. For example, a thousand different candidate instruction sets may be determined that satisfactorily traverse reference point 108 of end effector 106 along a candidate path. One of those candidate instruction sets may then be selected based on it causing the "least amount" of robot joint motion (e.g., the candidate instruction set associated with the lowest CISC).

Figure 2A:
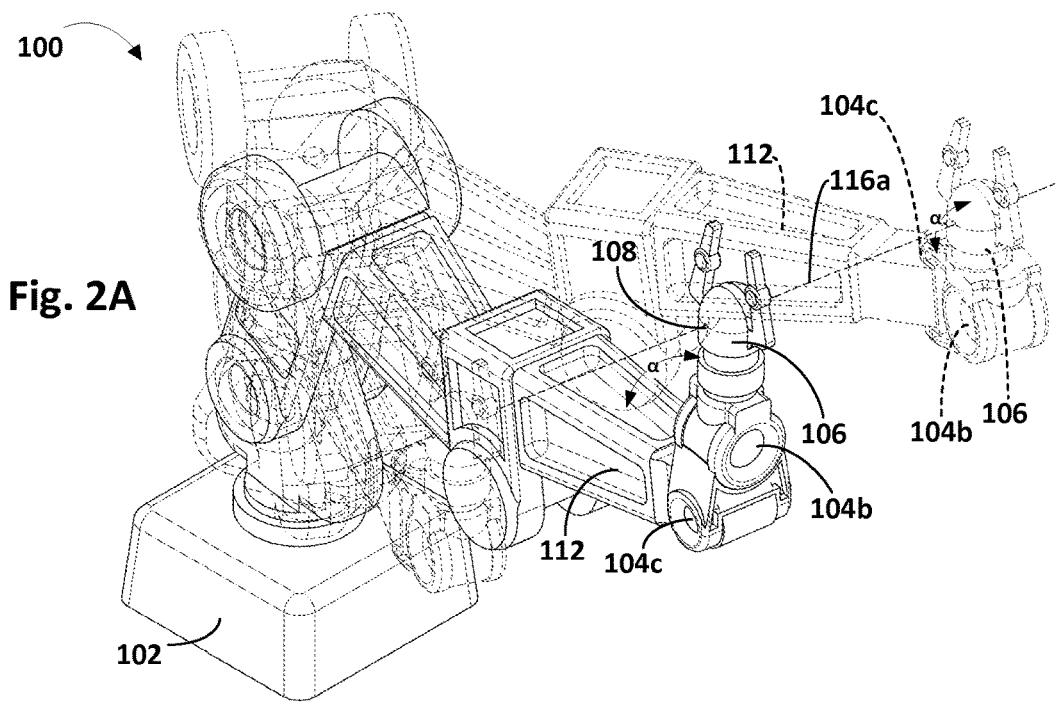
FIGS. 2A and B illustrate the example robot of FIG. 1 striking different sets of poses while traversing a reference point of an end effector along the same reference path, in accordance with various implementations.

FIGS. 2A and B depict two examples of sets of poses that may be struck by robot 100 while traversing reference point 108 of end effector 106 along first path 116a. In FIG. 2A, robot 100 traverses reference point 108 of end effector 106 along path 116a by extending end effector 106 into path 116a from below (e.g., "underhanded"). As can be seen, path 116a is farther from base 102 of robot 100 at the respective ends of path 116a than near its middle, when path 116a passes closest to base 102. Thus, while traversing reference point 108 along path 116a as shown in FIG. 2A, robot 100 strikes a first series of poses to maintain a central angle α formed between end effector 106 and arm portion 112. For example, and as shown by the phantom and non-phantom images, third operational component 104b rotates, and is itself rotated, to maintain reference point 108 on path 116a. Other operational components 104 of robot 100 may also need to vary their configurations in order to maintain reference point 108 along path 116a, as is demonstrated by the phantom images in FIG. 2A.

Figure 2B:
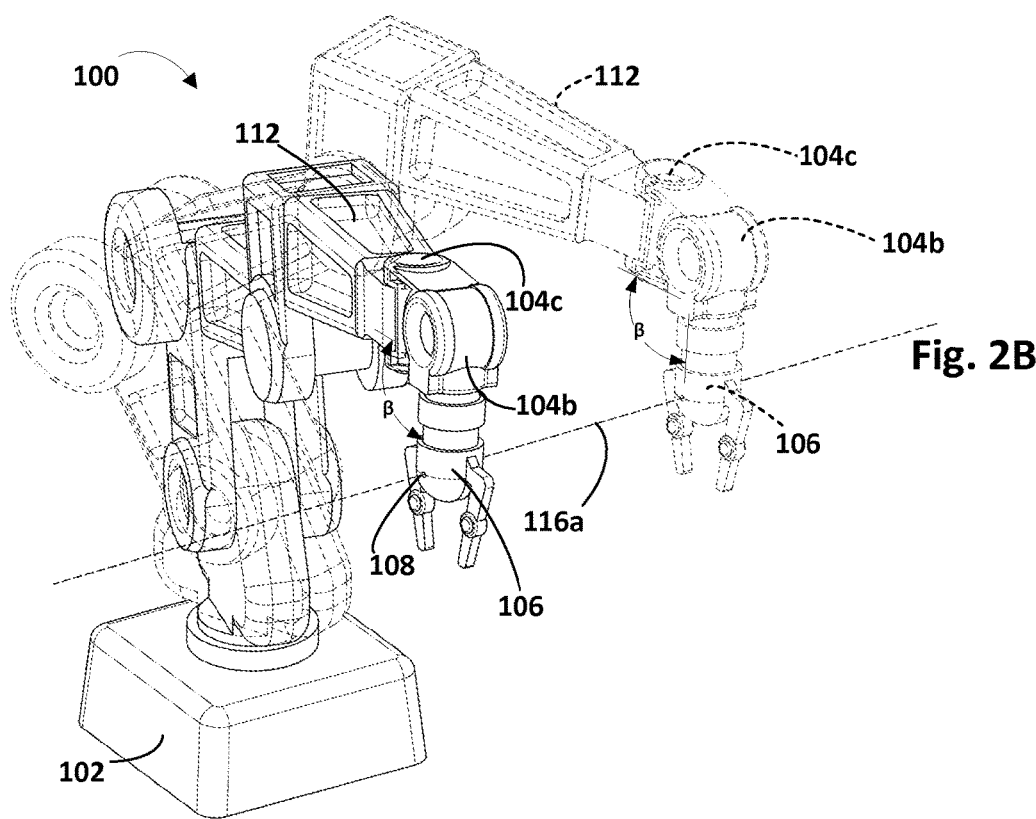

In FIG. 2B, robot 100 traverses reference point 108 of end effector 106 along path 116a in a different manner than in FIG. 2A, this time extending end effector 106 into path 116a from above (e.g., "overhanded"). Once again, to traverse reference point 108 along path 116a as shown in FIG. 2B, robot 100 strikes a series of poses in which a central angle β between end effector 106 and arm portion 112 is maintained while reference point 108 is traversed along path 116a. As was the case with FIG. 2A, path 116a is farther from base 102 of robot 100 at the respective ends of path 116a than near its middle, when path 116a passes closest to base 102. Thus, and as shown by the phantom images, robot 100 strikes a second, different series of poses to maintain reference point 108 on path 116a. Various operational components 104 of robot 100 may vary their configurations in various ways in order for robot 100 to strike this alternative series of poses, as is demonstrated by the phantom image in FIG. 2B.

Traversing reference point 108 along path 116a using the different sets of poses shown in FIGS. 2A and 2B, respectively, may cause various amount of cost (e.g., wear and tear, excessive motion) to be incurred. In various implementations, these varying costs may be taken into consideration when selecting an instruction set (corresponding to a set of poses) for robot 100 to execute. If a first set of poses causes less wear and tear to a particular operational component 104 of interest than a second set, or if the first set of poses causes less average cost across multiple operational components 104 than the second set, than an instruction set that causes robot 100 to strike the first set of poses may be selected for implementation.

As mentioned above, in addition to robot 100 being able to strike multiple sets of poses while traversing object 110 and/or reference point 108 along a given path, it is also possible for robot 100 to traverse reference point 108 and/or object along multiple different paths, also referred to as "candidate" paths, between locations in order to accomplish a task. For example, robot 100 may be able to approach object 110 (e.g., to pick it up) in multiple physical arrangements and/or from multiple acceptable angles, and each angle of approach may require that robot 100 traverse reference point 108 along a different candidate path. Likewise, robot 100 may be able to place object 110 at a destination site in multiple physical arrangements and/or from multiple acceptable angles, with each angle requiring that robot traverse object 110 along a different candidate path. Additionally, object 110 may be placed in multiple different physical arrangements (at its origin or destination), and each candidate physical arrangement may require that robot 100 traverse reference point 108 and/or object 110 along a different candidate path. In sum, due to the multiple potential physical arrangements of object 110 (both at pick up and delivery) and the multiple different angles from which robot 100 can approach and/or deliver object 110 in each physical arrangement, there may be a multitude of candidate paths traversable by reference point 108 of robot 100 and/or object 110, and each candidate path may have an associated candidate path cost, or "CPC."

Figure 3A:
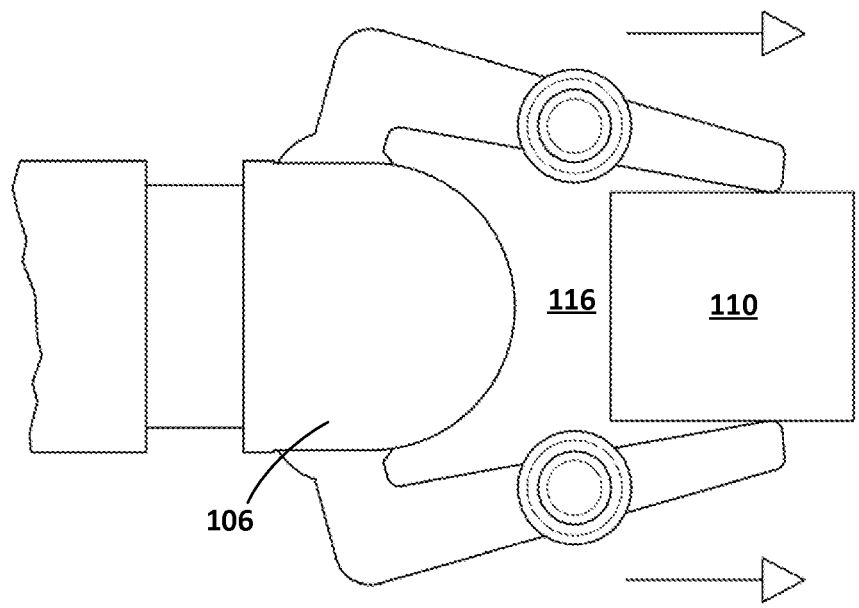
FIGS. 3A-B illustrate how an example robot end effector may act upon an object while in two different configurations, in accordance with various implementations.
Figure 3B:
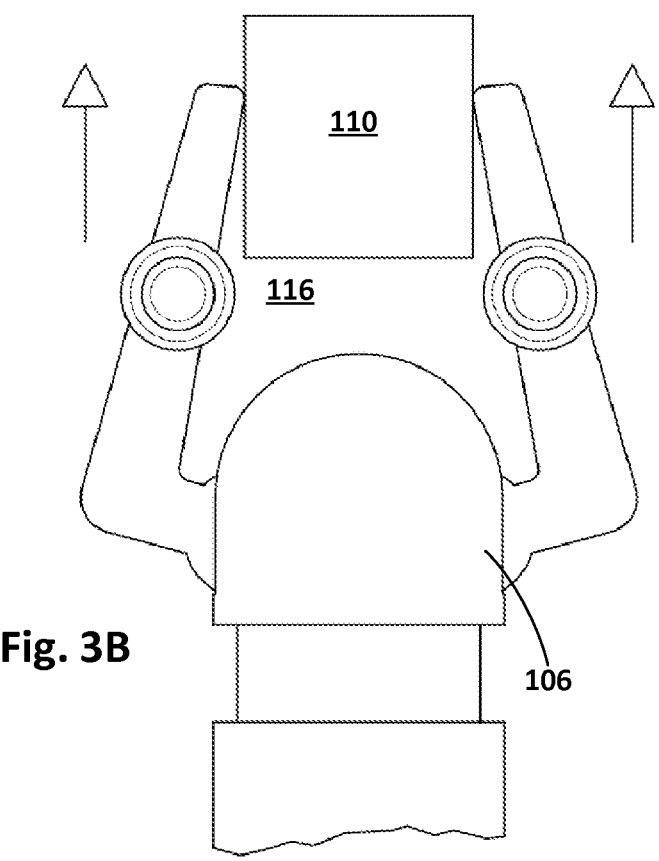

FIGS. 3A and 3B depict an example of how object 110 may be approached from multiple angles. FIGS. 3A and 3B look down from above at a site 116 of object 110 which is to be acted upon (e.g., picked up) by robot 100 (only end effector 106 is visible in FIGS. 3A and 3B), resting on a plane. As noted above, robot 100 may maneuver end effector 106 towards object 110 from multiple angles. For example, in FIG. 3A, end effector 106 is maneuvered towards object 110 from the left. In FIG. 3B, by contrast, end effector 106 is maneuvered towards object 110 from below. Depending on the circumstances, either approach may be acceptable. Other un-depicted approaches may also be acceptable. Suppose that object 110 is not fragile and that it does not matter if an orientation of object 110 is changed during its travels. It may be acceptable for end effector 106 to be placed in either of the configurations shown in FIG. 3A or 3B to pick up object 110. It may also be acceptable for end effector 106 to pick up object from above, or from various intermediate angles.

As was the case for path 116a described above, robot 100 may strike a different set of poses for each candidate path. Accordingly, in various implementations, a plurality of candidate instructions sets may be determined for each candidate path. Similar to above, each candidate instruction set of each plurality of candidate instruction sets may be configured to cause robot 100 to strike a different respective set of poses while traversing reference point 108 and/or object 110 along a particular candidate path. A cost, or "CISC," that would be incurred, e.g., by one or more operational components 104 of robot 100, while implementing each candidate instruction set of each plurality of candidate instruction sets may be calculated. Then, for each candidate path, a candidate instruction set associated with a CISC that satisfies one or more criteria may be selected, and in some cases, the CISC may be associated with the candidate path as its associated candidate path cost, or "CPC."

Figure 4A:
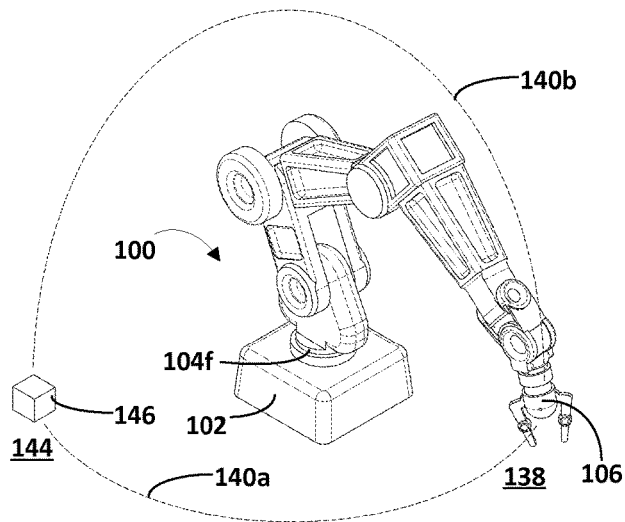
FIGS. 4A-C illustrate an example robot traversing a reference point of an end effector along different paths, in accordance with various implementations.
Figure 4B:
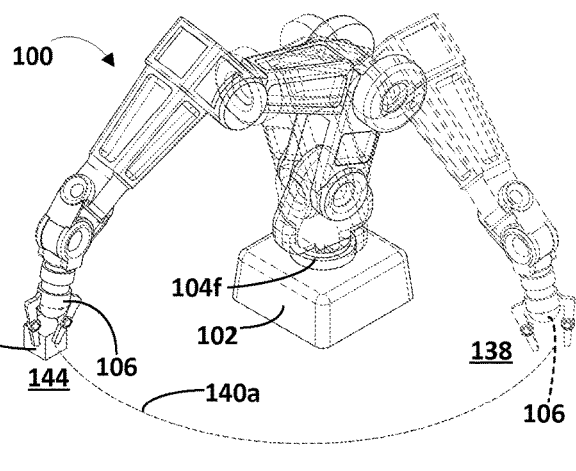
Figure 4C:
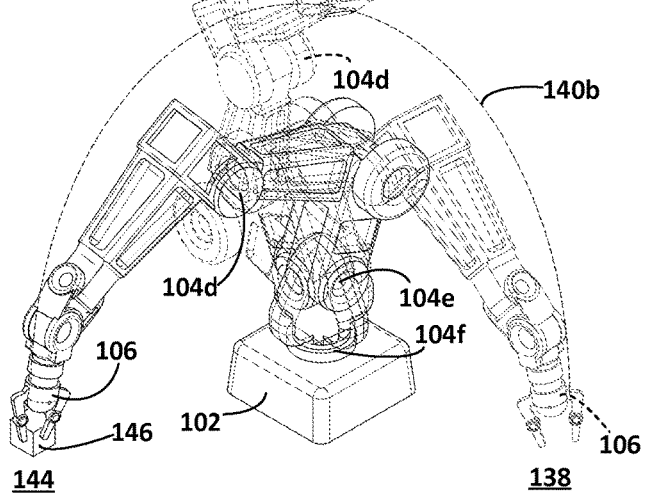

FIGS. 4A-C depict an example of how robot 100 may maneuver end effector 106 along multiple candidate paths 140a-b to multiple acceptable configurations at a destination site 144 of an object 146 to be acted upon. FIG. 4A depicts robot 100 at its starting position, with end effector 106 positioned at a starting site 138. Two candidate paths 140a and 140b to destination site 144 are depicted in dashed lines. First candidate path 140a circumnavigates around base 102 of robot 100. Second candidate path 140b forms an arc above robot 100.

FIG. 4B depicts robot 100 traversing end effector 106 along first candidate path 140a. As demonstrated by the phantom image of robot 100, the operational component 104 of robot 100 that does most of the work is sixth operational component 104f near base 102. Sixth operational component 104f rotates all of robot 100 above base 102 clockwise, so that end effector 106 traverses first candidate path 140a and approaches destination site 144 and object 146 from one side. Most other operational components 104 of robot 100 impart and/or experience little or no movement or force.

FIG. 4C depicts robot 100 traversing end effector 106 along second candidate path 140b. As demonstrated by the phantom images of robot 100 at various intervals, several operational components 104 of robot 100 impart and/or experience movement or force in order for robot 100 to traverse end effector 106 towards destination site 144 and object 146 from above. Notably, in FIG. 4C, sixth operational component 104f near base 102 imparts and/or experiences little or no rotation. Accordingly, if it is preferable to minimize wear and tear on sixth operational component 104f, then second candidate path 140b may be selected for implementation by robot 100. By contrast, if it is preferable to minimize wear and tear across other operational components (e.g., 104d, 104e), rather than sixth operational component 104f, then first candidate path 140a may be selected for implementation by robot 100. In some implementations, a CPC associated with each candidate path 140a, 140b may be determined by analyzing a plurality of sets of poses (and corresponding instruction sets) that robot 102 may strike while traversing end effector 106 along that candidate path. For example, the instruction set (and corresponding set of poses) that imparts the lowest cost (or the first instruction set calculated to impart an acceptable cost) on one or more selected operational components 104 may be selected as the CPC for that candidate path.

Figure 5:
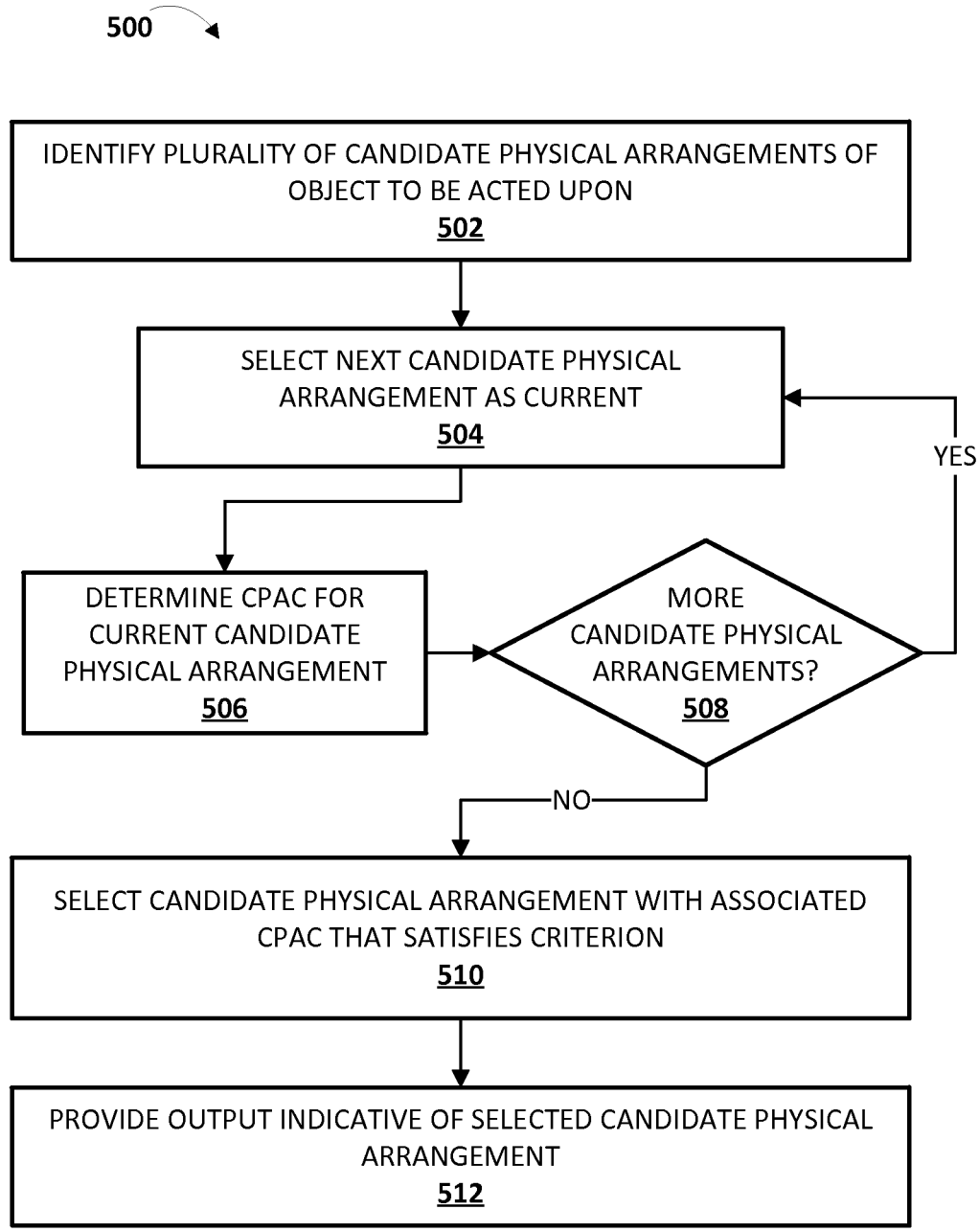
FIGS. 5 and 6 depict a flow chart illustrating an example method of selecting object physical arrangements to account for costs, in accordance with various implementations.

Referring now to FIG. 5, an example method 500 of selecting a candidate physical arrangement of an object to be acted upon by a robot is described. For convenience, the operations of flow charts are described with reference to a system that performs the operations. This system may include various components of various computer systems, including computing elements of robot 100 and/or computing systems remote from robot 100, such as control system 850 in FIG. 8. Moreover, while operations of method 500 are shown in a particular order, this is not meant to be limiting. One or more operations may be reordered, omitted or added.

At block 502, the system may identify a plurality of candidate physical arrangements of an object (e.g., 110) to be acted upon. These plurality of candidate physical arrangements may include candidate physical arrangements of the object at any stage of interaction between the robot and the object, including but not limited to at an origin or intermediate pick up site of the object, at an intermediate or final drop off site of the object, and so forth.

At block 504, the system may select a particular candidate physical arrangement of the plurality identified at block 502 as the "current" candidate physical arrangement of object. At block 506, the system may determine a candidate physical arrangement cost, or CPAC, associated with the current candidate physical arrangement of the object. As noted above, the CPAC may be, for instance, a measure of wear and tear that will be incurred on one or more operational components of the robot if the object is in the current physical arrangement when acted upon by the robot, or left in the current physical arrangement after acted upon by the robot. Example operations that may be performed to determine the CPAC at block 506 are depicted in FIG. 6 and described below.

At block 508, the system may determine whether there are more candidate physical arrangements for which a CPAC has not yet been determined. If the answer is yes, the method 500 proceeds back to block 504. If the answer at block 508 is no, however, then method 500 may proceed to block 510. At block 510, the system may select a candidate physical arrangement with an associated CPAC that satisfies some criterion. For example, the criterion may be an acceptable or minimum CPAC incurred by one or more selected operational components of the robot. At block 512, the system may cause output to be provided that is indicative of the selected candidate physical arrangement. For example, a message may be displayed on computer screen that instructs a technician to place the object at a particular location, at a particular orientation, and/or in a particular configuration.

Figure 6:
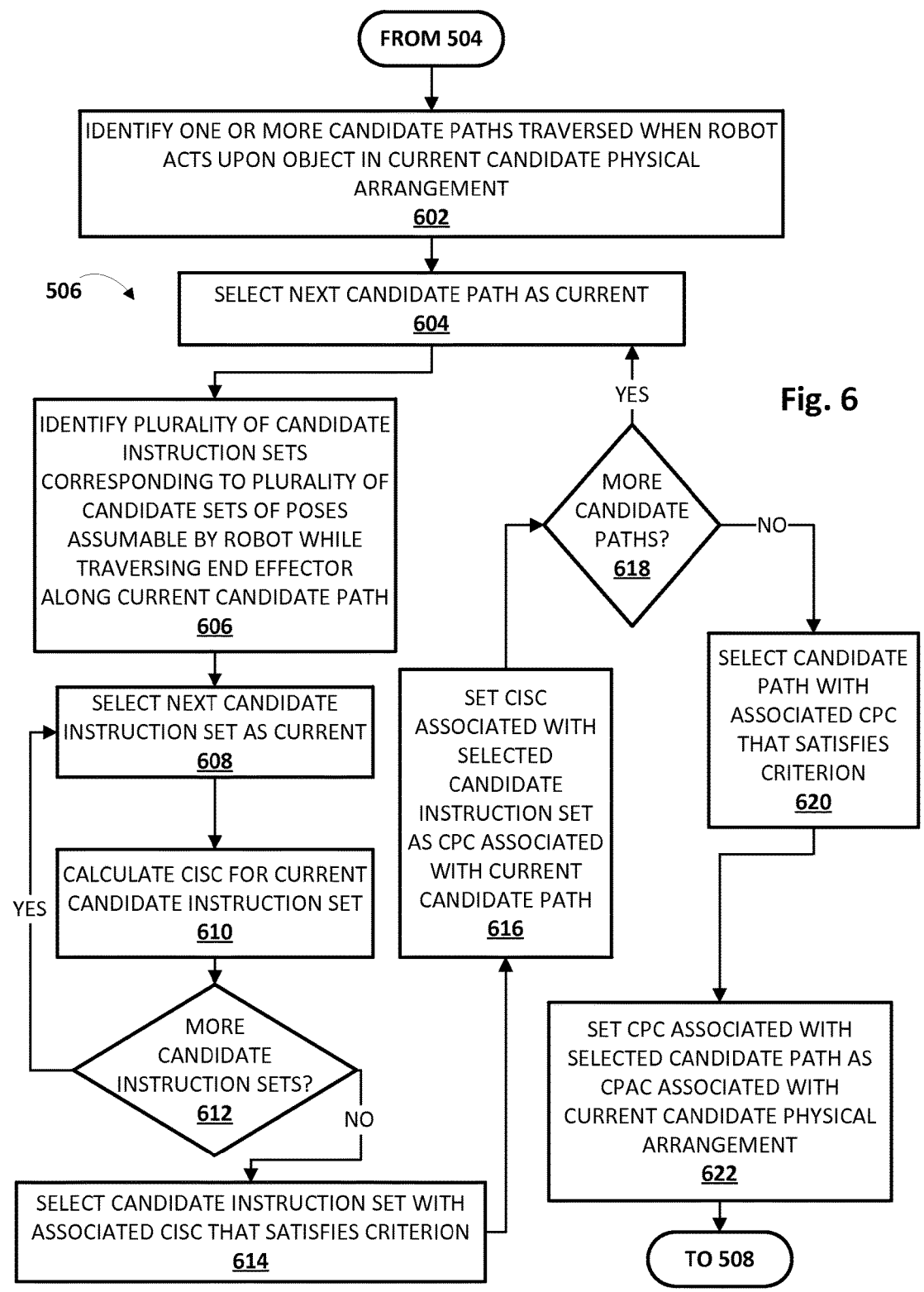

FIG. 6 depicts example operations that may be implemented as part of block 506 of FIG. 5. At block 602, the system may identify one or more candidate paths traversable by a reference point of a robot end effector between a first site and a second site where the object is arranged in the current candidate physical arrangement. At block 604, the system may select one of the identified candidate paths as a "current" path for analysis. At block 606, the system may determine a plurality of candidate instruction sets that will cause the robot to strike a corresponding plurality of candidate sets of poses while traversing its end effector reference point along the current candidate path.

At block 608, the system may select one of the candidate instruction sets identified at block 606 as a "current" candidate instruction set for analysis. At block 610, the system may calculate a candidate instruction set cost, or "CISC," associated with the current candidate instruction set. As noted above, calculation of the CISC may take into account a variety of factors, such as one or more weights of one or more other portions of robot, a weight of an object to be carried (if applicable for the task), relative positions of various components of the robot during various poses that would be struck by the robot when executing the current candidate instruction set, duration of those various poses, and so forth.

After the CISC associated with the current candidate instruction set is calculated at block 610, at block 612, the system may determine whether there are more candidate instruction sets for which costs have not yet been calculated. If the answer is yes, method 600 may proceed back to block 608, the next candidate instruction set may be selected as the "current" candidate instruction set, and blocks 610-612 may be repeated. If the answer at block 612 is no, however, then method 600 may proceed to block 614.

At block 614, the system may select a candidate instruction set of the plurality of candidate instruction sets identified at block 606 that has an associated CISC (calculated at block 610) that satisfies some criterion. In some implementations, the criterion may be a minimum CISC among the plurality of candidate instruction sets. At block 616, the system may set the CISC associated with the candidate instruction set selected at block 614 as the candidate path cost, or "CPC," associated with the "current" candidate path (which was selected back at block 604).

At block 618, the system may determine whether there are more candidate paths for which costs have not yet been calculated. If the answer is yes, method 600 may proceed back to block 604, the next candidate path may be selected as the "current" path, and blocks 606-616 may be repeated. If the answer at block 618 is no, however, then method 600 may proceed to block 620.

At block 620, the system may select, from a plurality of candidate paths identified at block 602, the candidate path with an associated CPC (determined at block 616) that satisfies some criterion. In some implementations, the criterion in this instance may be the candidate path having the lowest associated CPC. At block 622, the system may set the CPC associated with the selected candidate path as the candidate physical arrangement cost, or "CPAC," associated with the current candidate physical arrangement. Implementation may then proceed back to block 508 of FIG. 5.

Figure 7:
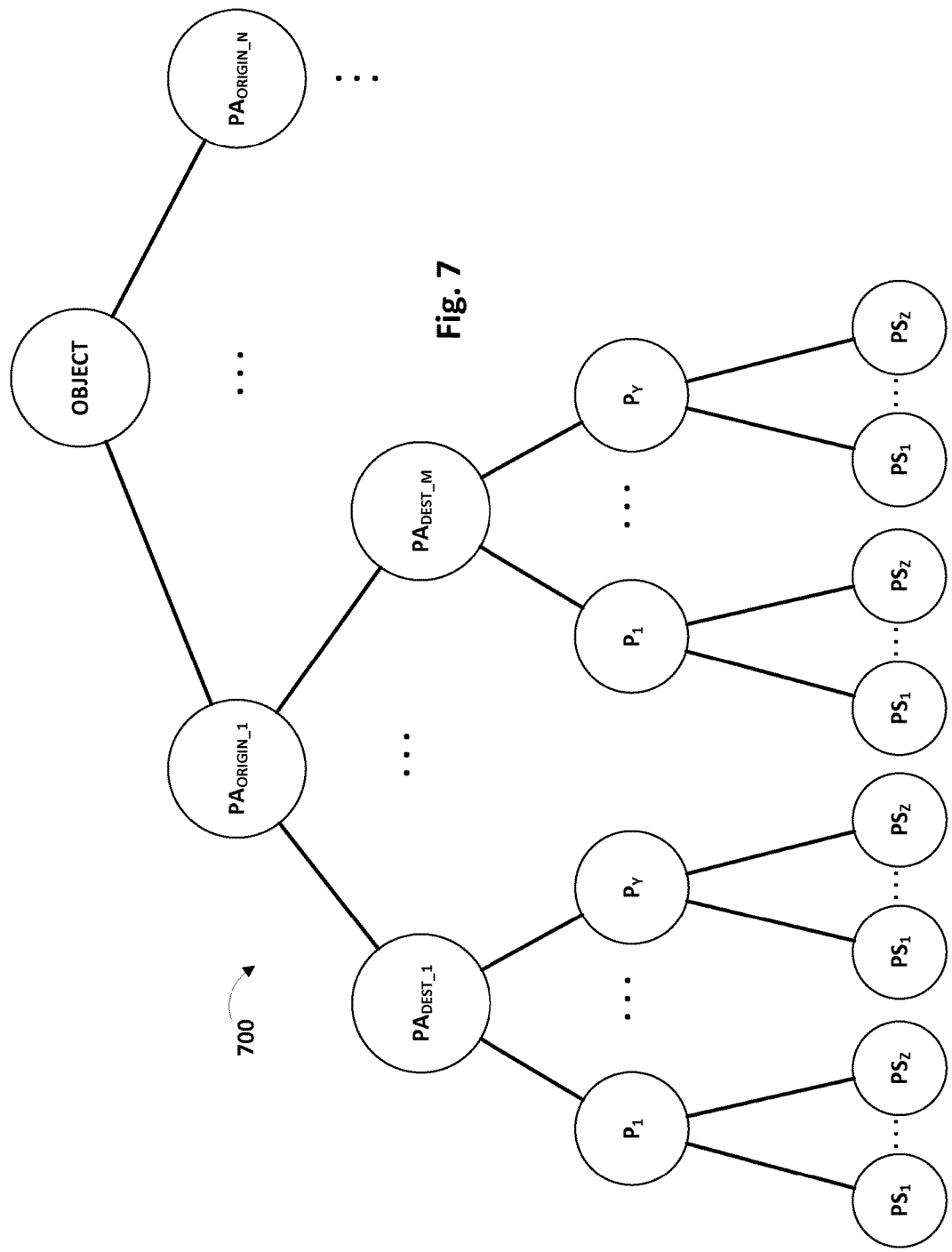
FIG. 7 depicts a portion of an example pose tree that may be utilized, in accordance with various implementations.

FIG. 7 schematically depicts part of a so-called "pose tree" 700 that may be built in some implementations to evaluate costs and select physical arrangements of objects. Pose tree 700 is not meant to be limiting, and in various implementations, pose trees having different arrangements may be employed in addition to or instead of pose tree 700. In this example, the root node represents a particular object (e.g., 110) that is to be acted upon by a robot (e.g., 100). Suppose that object is to be moved from an origin site to a destination site. The root object node may be connected to a plurality of nodes, $PA_{ORIGIN\_1}$ though $PA_{ORIGIN\_N}$, each representing a candidate physical arrangement of the object at its origin. For example, in one origin physical arrangement, the object may be at one location within a boundary volume, and in another origin physical arrangement, the object may be at another location within the boundary volume. Additionally or alternatively, in one origin physical arrangement, the object may be oriented in a first manner (e.g., facing one direction), and in another origin physical arrangement, the object may be oriented in a second manner (e.g., facing an opposite direction).

Each origin candidate physical arrangement node may be connected to a plurality of nodes, $PA_{DEST\_1}$ through $PA_{DEST\_M}$, each representing a candidate physical arrangement of the object at its destination site. Each destination candidate physical arrangement node may in turn be connected to a plurality of path nodes, $P_1$ through $P_Y$, each representing a candidate path from the origin candidate physical arrangement node under consideration to the destination candidate physical arrangement node under consideration. Each candidate path node may in turn be connected to a plurality of pose set nodes, $PS_1$ through $PS_Z$, each representing a candidate set of poses (and a corresponding instruction set) that may be implemented by the robot to traverse a reference point of its end effector along the candidate path under consideration.

As described in FIGS. 5 and 6, in some implementations, the CISC associated with each pose set node ($PS_1$-$PS_Z$) may be calculated. The CISC that satisfies some criterion (e.g., the lowest CISC) may be propagated up pose tree 700 and set as the CPC for the candidate path node under consideration. Then, CPCs associated with a plurality of candidate path nodes from a particular origin candidate physical arrangement node to a particular destination candidate physical arrangement node may be compared (e.g., ranked). The CPC that satisfies some criterion (e.g., the lowest CPC) may be propagated up pose tree 700 and set as the CPAC for a particular destination candidate physical arrangement node. Then, for each origin candidate physical arrangement node, the destination candidate physical arrangement node having a CPAC that satisfies some criterion (e.g., minimum CPAC) may be set as the origin candidate physical arrangement node's CPAC. Pose tree 700 may be traversed in this manner until an acceptable or minimum CPAC for the object to be acted on by the robot is determined.

Figure 8:
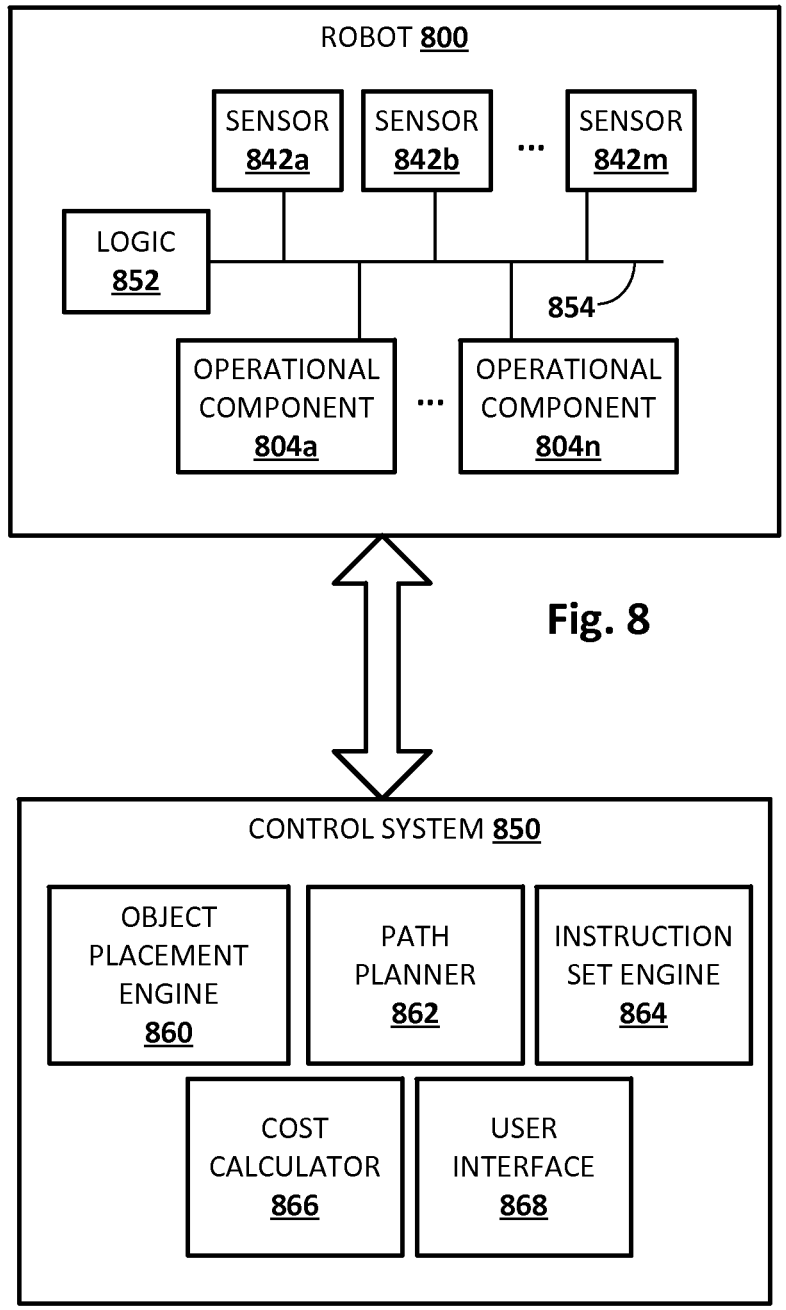
FIG. 8 schematically depicts an example environment in which disclosed techniques may be implemented.

FIG. 8 is a schematic diagram of an example environment in which selected aspects of the present disclosure may be implemented. A robot 800 may be in communication with a control system 850. Robot 800 may take various forms, including but not limited to a robot arm similar to robot 100 described above, a humanoid form, an animal form, a wheeled device, a submersible vehicle, an unmanned aerial vehicle ("UAV"), and so forth. In various implementations, robot 800 may include logic 852. Logic 852 may take various forms, such as one or more processors, one or more field-programmable gate arrays ("FPGA"), one or more application-specific integrated circuits ("ASIC"), one or more so-called "real time controllers," and so forth.

In various implementations, logic 852 may be operably coupled with one or more operational components 804*a-n* and/or one or more sensors 842*a-m*, e.g., via one or more buses 854. Sensors 842 may take various forms, including but not limited to light sensors, pressure sensors, pressure wave sensors (e.g., microphones), proximity sensors, accelerometers, gyroscopes, thermometers, barometers, and so forth. While sensors 842*a-m* are depicted as being integral with robot 800, this is not meant to be limiting. In some implementations, sensors 842 may be located external to robot 800, e.g., as standalone units or as part of control system 850.

Control system 850 may include one or computing systems connected by one or more networks (not depicted) that control operation of robot 800 to various degrees. An example of a single computing system is depicted schematically in FIG. 9. In some scenarios, the amount of computation required to both identify candidate physical arrangements and to determine costs associated with candidate physical arrangements may be high. Accordingly, in some implementations, a potentially large (e.g., hundreds or thousands), sometimes variable number of computing systems (which may or may not be scattered across multiple disparate networks) may collectively implement control system 850, e.g., as a "cloud." In some such instances, the multiple computing systems may operate in parallel, with each computing system handling a relatively small and/or manageable set of computations.

In some implementations, control system 850 exerts a relatively high level of control over robot 800, e.g., in real time in response to signals received at a user interface 868 and/or one or more readings from one or more sensors 842. In other implementations, control system 850 exerts less direct control over robot 800. For example, control system 850 may provide robot 800 with high level tasks (e.g., "pick up object", "place object into receptacle"), data indicative of one or more obstacles to avoid, and/or other general constraints that robot 800 may be unable to ascertain itself by processing signals from sensors 842. Logic 852 on robot 800 may convert such high level commands and other data into robot action, e.g., by translating one or more high level tasks into a plurality of motion primitives executable by robot 800. In some implementations, this translation of high level tasks or commands into low level motion primitives may take into account various incurred costs, e.g., by using disclosed techniques.

Various modules or engines may be implemented as part of control system 850 as software, hardware, or any combination of the two. For example, in FIG. 6, control system 850 includes an object placement engine 860, a path planner 862, an instruction set engine 864, and a cost calculator 866. Object placement engine 860 may be configured to identify a plurality of candidate physical arrangements for an object (at its origin or destination). In some implementations, object placement engine 860 may be further configured to select, from the plurality of candidate physical arrangements, one or more candidate physical arrangements that satisfy some criterion, as described above at block 510 of FIG. 5.

Path planner 862 may be configured to identify a plurality of candidate paths traversable by a reference point of robot 800 to accomplish one or more tasks, e.g., as described above at block 602 of FIG. 6. In some implementations, path planner 862 may be further configured to select, from the plurality of candidate paths, one or more that satisfy some criterion, as described above at block 620 of FIG. 6. To select one or more task paths, path planner 862 may take into consideration various signals, such as signals indicative of obstacles (both stationary and dynamic) within an environment in which robot 800 operates, signals indicative of one or more capabilities of robot 800 (which may change over time, for instance, based on power drain and/or wear and tear), signals about costs incurred by various operational components of robot 800 (e.g., as provided by cost calculator 866), and so forth.

In various implementations, instruction set engine 864 may be configured to generate, for each candidate path, a plurality of instruction sets, each instruction set executable by robot 800 to traverse an end effector reference point of robot 800 along the candidate path. In some implementations, instruction set engine 864 may be configured to select "most suitable" and/or "good enough" instruction sets configured to cause robot 800 to strike a plurality of respective sets of poses while traversing an end effector along a path, as described above. In various implementations, cost calculator 866 may be configured to calculate costs associated with robot 800 executing instruction sets generated or selected by instruction set engine 864, e.g., as described above with respect to block 610 of FIG. 6.

A user interface 868 may be provided that facilitates user input of various commands or tasks for robot 800. In some implementations, user interface 868 may be provided as a graphical user interface rendered on a mobile computing system such as a smart phone or tablet. A user may operate the graphical user interface to control robot 800 to various degrees. For example, to define a reference path as described above, a user may operate user interface 868 to define one or more waypoints on a three-dimensional rendering of an environment in which robot 800 operates. In some implementations, user interface 868 may be operable by a user to cause robot 800 to enter a "training" mode in which the user may manually manipulate one or more operational components or robot 800 (e.g., end effector 106) along one or more paths, all while robot 800 continuously and/or periodically records its coordinates.

While robot 800 and control system 850 are depicted separately in FIG. 8, this is not meant to be limiting. In various implementations, one or more aspects (e.g., modules, engines, user interface 868, etc.) depicted in FIG. 8 as implemented on one of robot 800 or control system 850 may be implemented on the other, may be distributed across both, and/or may be distributed across one or both in combination with other components not depicted in FIG. 8. In implementations where robot 800 and control system 850 are separate, they may communicate over one or more wired or wireless networks (not depicted), or using other wireless technologies, such as radio, infrared, Bluetooth, etc. In other implementations, control system 850 may be implemented entirely or in part using logic 852 of robot 800.

Figure 9:
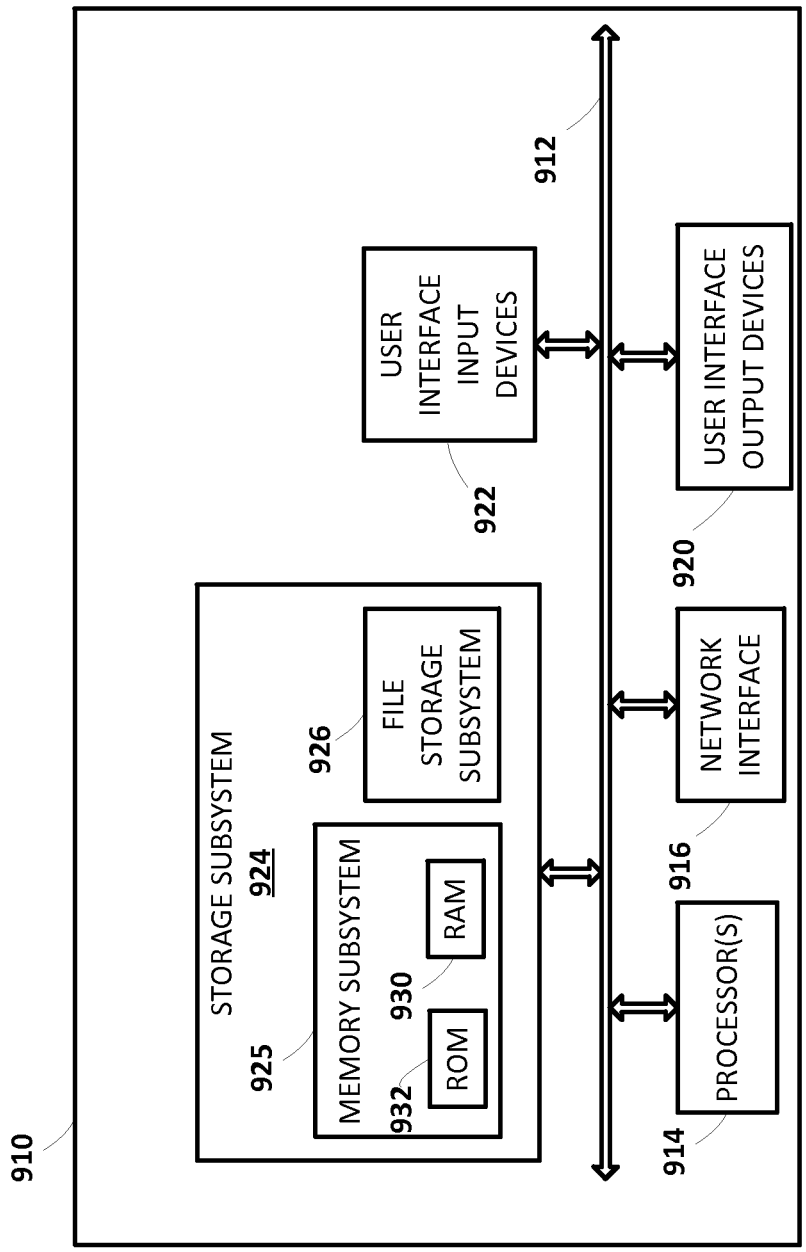
FIG. 9 schematically depicts an example architecture of a computer system.

FIG. 9 is a block diagram of an example computer system 910. Computer system 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to perform selected aspects of method 500, and/or to implement one or more aspects of logic 852, object placement engine 860, path planner 662, instruction set engine 864, cost calculator 866, and/or user interface 868. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a CD-ROM drive, an optical drive, or removable media cartridges. Modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   determining, by one or more processors, one or more spatial constraints associated with an object to be acted upon by a robot;
   determining, by one or more of the processors, a plurality of candidate physical arrangements of the object that satisfy the one or more spatial constraints;
   receiving as input, by one or more of the processors for each of the candidate physical arrangements, a plurality of candidate paths traversable by a reference point of an end effector in acting upon the object in the candidate physical arrangement;
   calculating, by one or more of the processors, for each of the plurality of candidate physical arrangements of the object and for each of the candidate paths for the candidate physical arrangement, a cost that would be incurred as a result of the robot acting upon the object in the candidate physical arrangement using the candidate path, wherein the calculating includes:
      determining, from the plurality of candidate paths, a path traversable by the reference point associated with the end effector of the robot to a site corresponding to at least one of the plurality of candidate physical arrangements of the object,
      determining a plurality of candidate instructions sets, each candidate instruction set configured to cause the robot to assume a different respective set of poses while traversing the reference point along the path, and
      calculating, for each candidate instruction set, a candidate instruction set cost that would be incurred to implement the candidate instruction set to traverse the reference point along the path;
   selecting, by one or more of the processors, the candidate physical arrangement and candidate path associated with the cost that satisfies a criterion, wherein the selecting includes selecting, from the plurality of candidate instruction sets, the candidate instruction set associated with the candidate instruction set cost that satisfies the criterion or another criterion; and
   with the object in the selected candidate physical arrangement, operating the robot to act upon the object using the selected candidate path.

2. The computer-implemented method of claim 1, wherein the plurality of physical arrangements comprise a plurality of potential sites of the object that satisfy the spatial constraints.

3. The computer-implemented method of claim 1, wherein the plurality of physical arrangements comprise a plurality of potential orientations of the object that satisfy the spatial constraints.

4. The computer-implemented method of claim 1, wherein the plurality of candidate paths are traversable by a reference point of the end effector of the robot between a first site and a plurality of sites corresponding to the plurality of candidate physical arrangements of the object.

5. The computer-implemented method of claim 1, wherein calculating the cost that would be incurred as a result of the robot acting upon the object in the candidate physical arrangement is based at least in part on a candidate path cost associated with the selected candidate path.

6. The computer-implemented method of claim 1, wherein calculating the cost that would be incurred as a result of the robot acting upon the object in the candidate physical arrangement is based at least in part on the candidate instruction set cost associated with the selected candidate instruction set.

7. The computer-implemented method of claim 1, further comprising building, by the one or more processors, a pose tree and calculating the costs based on traversal of the pose tree.

8. The computer-implemented method of claim 1, wherein calculating, for each of the plurality of candidate physical arrangements of the object and for each of the candidate paths for the candidate physical arrangement, the cost that would be incurred as a result of the robot acting upon the object in the candidate physical arrangement comprises calculating the cost that would be incurred by a one or more operational components of the robot as a result of the robot acting upon the object in the candidate physical arrangement.

9. A method comprising:
  determining a plurality of candidate physical arrangements of an object to be acted upon by a robot;
  for one or more of the plurality of candidate physical arrangements:
    receiving input that defines a plurality of candidate paths traversable by a reference point associated with an end effector of the robot while the robot acts upon the object in the candidate physical arrangement;
    determining one or more candidate path costs associated with one or more of the plurality of candidate paths, wherein each of the candidate path costs is incurred by one or more operational components of the robot while traversing the reference point along a corresponding one of the candidate paths;
    selecting, from the plurality of candidate paths, a given candidate path, of the candidate paths, that has a determined given candidate path cost, of the candidate path costs, that satisfies a first criterion; and
    associating, with the candidate physical arrangement as a candidate physical arrangement cost, the given candidate path cost associated with the selected given candidate path, and
  selecting, from the one or more of the plurality of candidate physical arrangements, the candidate physical arrangement associated with the candidate physical arrangement cost that satisfies a second criterion; and
  operating the robot to act upon the object in the selected candidate physical arrangement;
  wherein determining the one or more candidate path costs associated with one or more of the plurality of candidate paths comprises, for each of the one or more of the plurality of candidate paths:
  determining a plurality of candidate instructions sets, each candidate instruction set configured to cause the robot to assume a different respective set of poses while traversing the reference point along the candidate path;
  calculating, for each of the plurality of candidate instruction sets, an associated candidate instruction set cost that would be incurred by the particular operational component of the robot while implementing the candidate instruction set to traverse the reference point along the candidate path;
  selecting, from the plurality of candidate instruction sets, the candidate instruction set associated with the candidate instruction set cost that satisfies a third criterion; and
  associating, with the candidate path as the candidate path cost, the candidate instruction set cost associated with the selected candidate instruction set.

10. A system comprising one or more processors and memory operably coupled with the one or more processors, wherein the memory stores instructions that, in response to execution of the instructions by one or more processors, cause the one or more processors to:
  determine one or more spatial constraints associated with an object to be acted upon by a robot;
  determine a plurality of candidate physical arrangements of the object that satisfy the one or more spatial constraints;
  receive as input for each of the candidate physical arrangements, a plurality of candidate paths traversable by a reference point of an end effector in acting upon the object in the candidate physical arrangement;
  calculate, for each of the plurality of candidate physical arrangements of the object and for each of the candidate paths for the candidate physical arrangement, a cost that would be incurred as a result of the robot acting upon the object in the candidate physical arrangement using the candidate path;
  select the candidate physical arrangement and candidate path associated with the cost that satisfies a criterion;
  determine a path traversable by the reference point associated with the end effector of the robot to a site corresponding to at least one of the plurality of candidate physical arrangements of the object;
  determine a plurality of candidate instructions sets, each candidate instruction set configured to cause the robot to assume a different respective set of poses while traversing the reference point along the path;
  calculate, for each candidate instruction set, a candidate instruction set cost that would be incurred to implement the candidate instruction set to traverse the reference point along the path;
  select, from the plurality of candidate instruction sets, the candidate instruction set associated with the candidate instruction set cost that satisfies the criterion or another criterion; and
  with the object in the selected candidate physical arrangement, operate the robot to act upon the object using the selected candidate path.

11. The system of claim 10, wherein the plurality of physical arrangements comprise a plurality of potential sites of the object that satisfy the spatial constraints.

12. The system of claim 10, wherein the plurality of physical arrangements comprise a plurality of potential orientations of the object that satisfy the spatial constraints.

13. The system of claim 10, wherein the plurality of candidate paths are traversable by a reference point of the end effector of the robot between a first site and a plurality of sites corresponding to the plurality of candidate physical arrangements of the object.

14. The system of claim 10, wherein the cost that would be incurred as a result of the robot acting upon the object in the candidate physical arrangement is calculated based at least in part on a candidate path cost associated with the selected candidate path.

* * * * *